United States Patent
Han

(10) Patent No.: US 9,278,623 B2
(45) Date of Patent: Mar. 8, 2016

(54) POWER GENERATION AND CHARGING DEVICE FOR CONTINUOUS RUNNING OF ELECTRIC AUTOMOBILE

(76) Inventor: Wenji Han, Urumqi (CN)

( * ) Notice: Subject to any disclaimer, the term of this patent is extended or adjusted under 35 U.S.C. 154(b) by 193 days.

(21) Appl. No.: 14/116,755

(22) PCT Filed: Apr. 27, 2012

(86) PCT No.: PCT/CN2012/074795
§ 371 (c)(1),
(2), (4) Date: Nov. 8, 2013

(87) PCT Pub. No.: WO2012/152192
PCT Pub. Date: Nov. 15, 2012

(65) Prior Publication Data
US 2014/0103875 A1    Apr. 17, 2014

(30) Foreign Application Priority Data

May 9, 2011   (CN) .......................... 2011 1 0129720

(51) Int. Cl.
| | |
|---|---|
| *B60L 11/18* | (2006.01) |
| *H02J 7/14* | (2006.01) |
| *H02K 21/24* | (2006.01) |
| *H02K 7/18* | (2006.01) |
| *H02K 53/00* | (2006.01) |
| *B60K 25/08* | (2006.01) |

(52) U.S. Cl.
CPC .......... *B60L 11/1809* (2013.01); *H02J 7/1423* (2013.01); *H02K 7/1807* (2013.01); *H02K 21/24* (2013.01); *H02K 53/00* (2013.01); *B60K 25/08* (2013.01); *B60L 2220/44* (2013.01); *Y02T 10/641* (2013.01); *Y02T 10/7005* (2013.01); *Y02T 90/14* (2013.01); *Y10S 74/09* (2013.01)

(58) Field of Classification Search
CPC ....................................................... H02J 7/1423
USPC ........................................................... 320/109
See application file for complete search history.

(56) References Cited

U.S. PATENT DOCUMENTS

2008/0257620 A1* 10/2008 Poulsen ....................... 180/65.2

* cited by examiner

*Primary Examiner* — Thuan Do
(74) *Attorney, Agent, or Firm* — Han IP Corporation; Andy M. Han

(57) ABSTRACT

A power generation and charging device for continuous running of an electric automobile comprises generators, a charger and a storage battery. The generators are disk generators and are arranged on rims of wheels. The power generation and charging device is provided with the storage battery as same as an automobile-mounted power supply, and current leading-out wires of the generators are connected with the storage battery through the charger and a circuit converter. The original storage battery of the electric automobile is connected with an automobile power supply binding post through the circuit converter. Through the power generation and charging device, a replaced power supply is provided when the electric quantity of the automobile-mounted power supply of the electric automobile is insufficient, and the continuous running mileage of the electric automobile is greatly increased.

2 Claims, 3 Drawing Sheets

POWER GENERATION AND CHARGING DEVICE FOR CONTINUOUS RUNNING OF ELECTRIC AUTOMOBILE

CROSS REFERENCE TO RELATED APPLICATIONS

This application is the U.S. national phase application of International application number PCT/CN2012/074795, filed on 27 Apr. 2012, which claims the priority benefit of China Patent Applications No. 201110129720.4, filed on 9 May 2011. The above-identified applications are hereby incorporated by reference in their entirety.

TECHNICAL FIELD

The present invention relates to a power generation and charging device and, in particular, to a power generation and charging device for electric automobiles.

BACKGROUND

In order to develop and utilize new types of energies, various automobiles using the same are emerging as the time passes. In view of the maturity status of technological development and China's national conditions, pure electric automobiles become the trend of future development and thus are vigorously promoted. Electric automobiles are powered by storage batteries, and are required to be charged at charging stations, when the storage batteries thereof are low on electric charge, for continued operation. The driving range of an electric automobile is dependent on the capacity of the automobile-mounted power battery. According to those skilled in the art in related fields, the range is 150 kilometers for an automobile using lead-acid storage batteries, and more than 300 kilometers for an automobile using lithium batteries, as far as the endurance ability of existing electric automobiles is concerned. Thus it can be seen that, the electric charge of the storage battery becomes the critical factor for the endurance ability of electric automobiles. In remote areas, different cities and towns are far away from each other, so it is necessary to build large numbers of charging stations along the highways in order for the popularization and application of electric automobiles. However, the wiring and building of charging stations tend to be expensive in investment, which becomes the biggest obstacle for the popularization of electric automobiles.

SUMMARY

Technical Problem to be Solved

The technical problem to be solved by the present invention is to provide a power generation and charging device for continuous running of an electric automobile, so that the driving range of the electric automobile is increased. The electric automobile can keep continuously running even if there is no power supply in cities and towns or no charging stations.

Technical Solution

In order to solve the above problem, the present invention provides a power generation and charging device for continuous running of an electric automobile, which comprises one or more generators, a charger and a storage battery. The one or more generators are disk-type generators, and are arranged on the rims of the wheels of the electric automobile. The storage battery, provided for the power generation and charging device, is the same as an automobile-mounted power supply. Current leading-out wires of the one or more generators are connected with the storage battery through the charger and a circuit converter. An original storage battery of the electric automobile is connected with the power supply terminals of the electric automobile through the circuit converter.

Each of the one or more generators of the power generation and charging device has a disk-shaped shell. A central shaft in the shell is mounted with two permanent magnet discs which are fastened on the shaft. Opposite, inner, side surfaces of the two permanent magnet discs are respectively provided with permanent magnets thereon, which are fixed within the surfaces of the discs, being opposite to each other with opposite polarities. A winding disc that is rotatable on the shaft is disposed between the two permanent magnet discs, and two side surfaces of the winding disc are provided with winding coils thereon, which are placed in the radial direction and fixed within the winding disc. A non-magnetic heavy object with an adjustable weight is filled in a certain local position on a surface of the winding disc, near an edge of the winding disc.

Beneficial Effects

The power generation and charging device for continuous running of an electric automobile according to the present invention provides the electric automobile with alternative power supplies when the automobile-mounted power supply is low on electric charge, so as to greatly increase the driving range of the electric automobile and promote the adoption of electric automobiles in remote areas. Meanwhile, the device of the present invention plays significant role in terms of energy saving, environmental protection and investment reduction in the promotion of electric automobiles.

DETAILED DESCRIPTION OF PREFERRED EMBODIMENTS

The power generation and charging device for continuous running of an electric automobile proposed by the present invention will be explained in detail in conjunction with the accompanying figures and embodiments.

Figure 1:
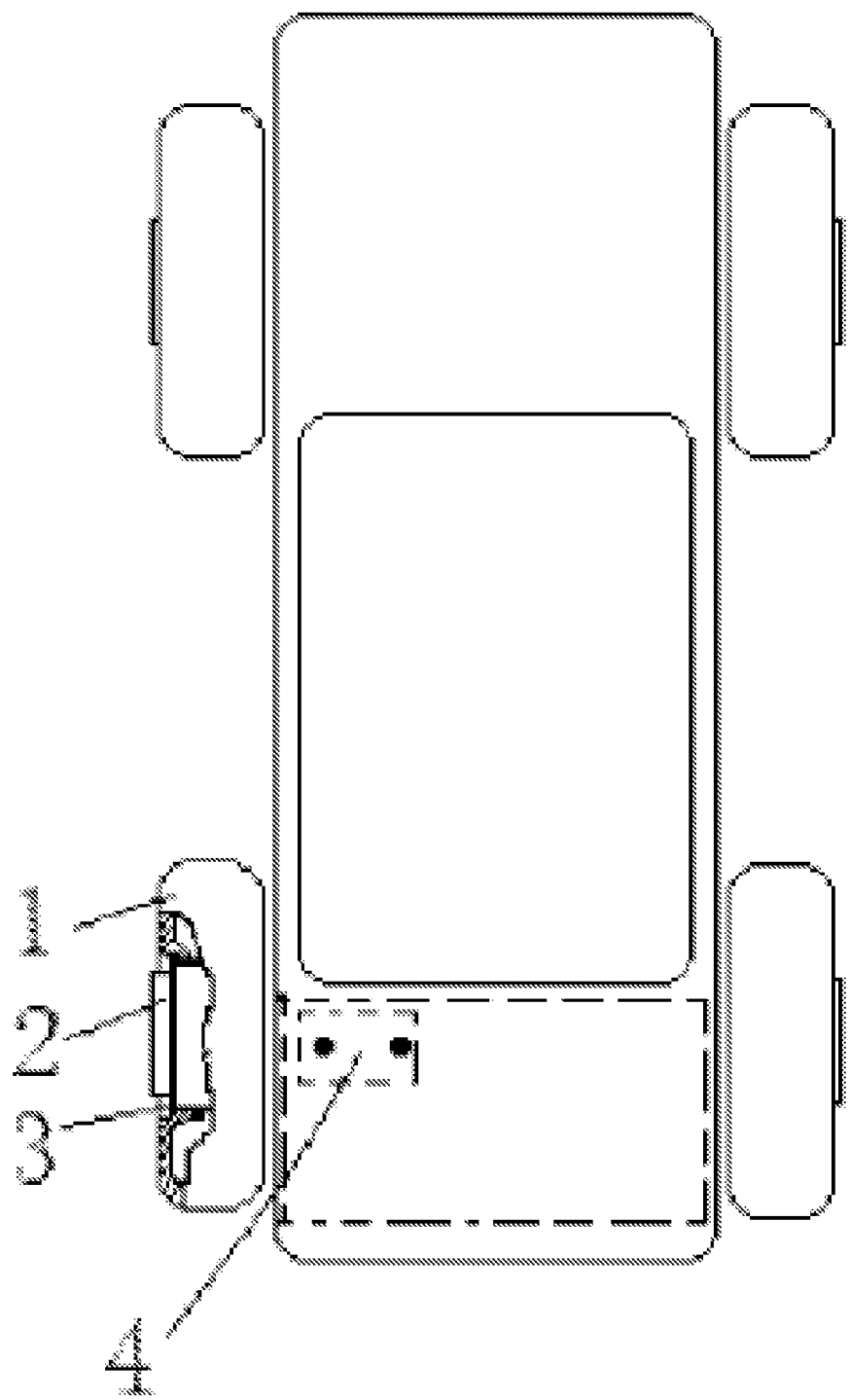
FIG. 1 is a schematic diagram of a power generation and charging device for continuous running of an electric automobile which is mounted on an electric automobile.
Figure 2:
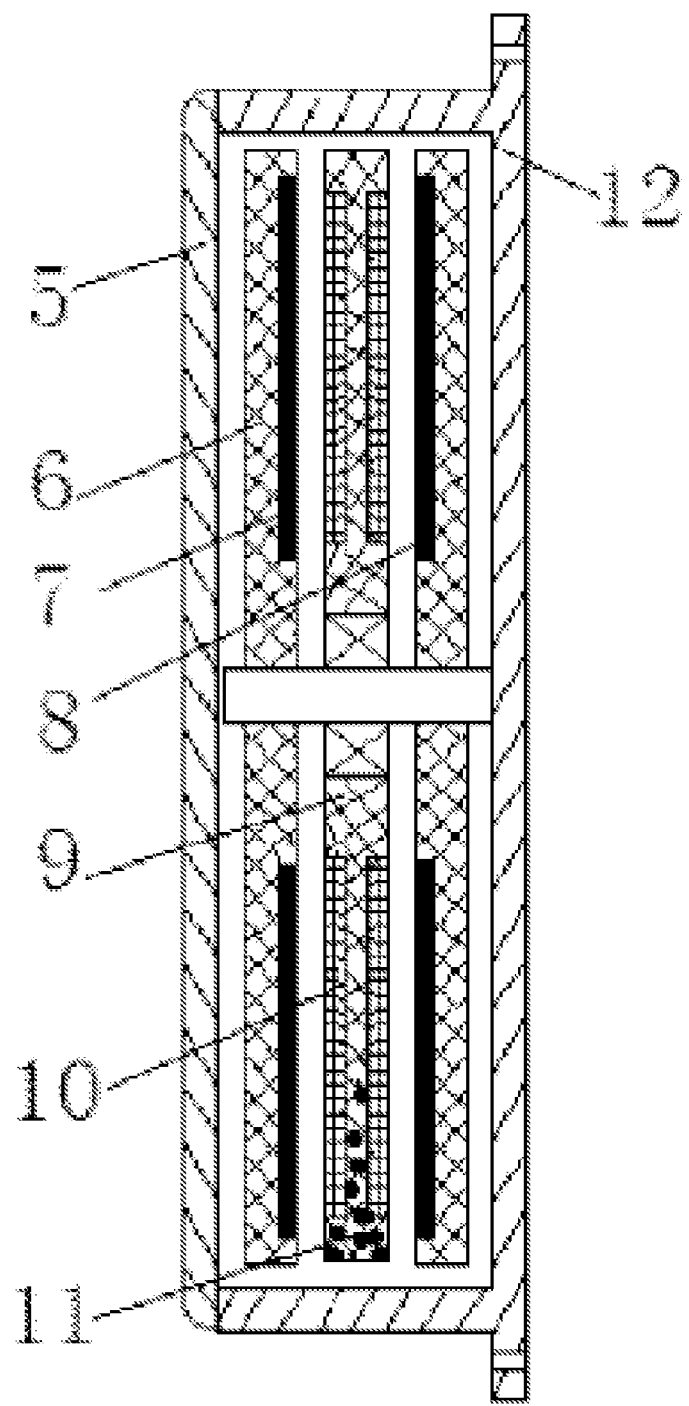
FIG. 2 is a structural schematic diagram of a disk-type generator used in the power generation and charging device for continuous running of an electric automobile.
Figure 3:
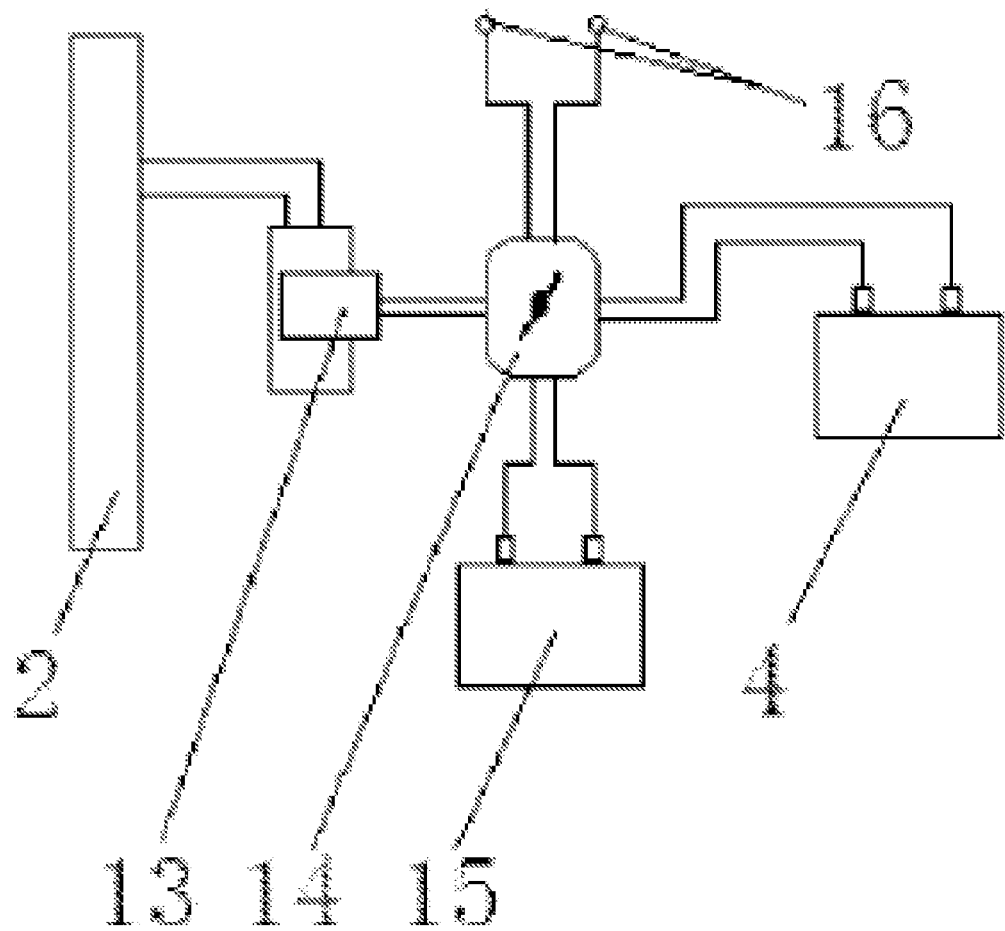
FIG. 3 is a schematic diagram of a circuit structure of the power generation and charging device for continuous running of an electric automobile which is equipped with a circuit converter.

As shown in FIGS. 1-3, a power generation and charging device for continuous running of an electric automobile comprises one or more generators 2, a charger 13 and a storage battery 4. The one or more generators 2 are disk-type generators which have small volume, light weight, low torque and high efficiency, and are arranged outside the rims 3 of the wheels 1. The storage battery 4, provided for the power generation and charging device, is the same as an electric automobile-mounted power supply. The storage battery 4, upon being charged, exchanges power supply and power charging with an original storage battery 15 of the electric automobile, through a circuit converter 14. The power generation and charging device with the circuit converter 14 has a first circuit structure in which the current leading-out wires of the disk generators 2 are connected with the charger 13. The charger 13 is connected with the circuit converter 14, and leading-out wires of the circuit converter 14 are connected with the storage battery 4 to charge the storage battery 4. The leading-out wires of the original storage battery 15 of the electric automobile are connected with the circuit converter 14, and leading-out wires of the circuit converter 14 are connected with power supply terminals 16 of the electrical automobile to supply power for the automobile. When electric charge of the original storage battery 15 of the electric automobile is almost depleted, a user can change the position of a switching key of the circuit converter 14 to convert the circuit to a second circuit structure such that the charger 13 is connected with the original storage battery 15 of the electric automobile through the circuit converter 14 so as to charge the original storage battery 15 of the electric automobile. The storage battery 4 of the power generation and charging device is connected with the power supply terminals 16 of the electric automobile through the circuit converter 14 to supply power for the electric automobile. The two storage batteries perform power supply and power charging, alternately, to ensure long distance continuous running of the electric automobile.

Each of the one or more generators of the power generation and charging device has a disk-shaped shell 12 with an end cover 5. The shell 12 is mounted on the rim of each of the four wheels of the electric automobile through an engaging lug, and rotates with the wheel. The shell 12 is provided with ventilation and cooling holes. The central shaft in the shell 12 is provided with two permanent magnet discs 6 which are fastened on the shaft. The circumferences of the inner side surfaces of the two permanent magnet discs have the same size and are provided with a permanent magnet A 7 and a permanent magnet B 8, respectively, which are placed in the radial direction, formed within the disc surfaces by casting resin, being opposite to each other with opposite polarities. A winding disc 9 that is rotatable on the shaft is disposed between the two permanent magnet discs. The circumferences of the two side surfaces of the winding disc 9 have the same size and are provided with winding coils 10 thereon, respectively, which are placed in the radial direction and formed within the surfaces of the winding disc 9 by casting resin. A non-magnetic heavy object 11 is disposed in a certain local position within the resins on the surface of the winding disc 9, near the edge of the winding disc 9. The weight of the non-magnetic heavy object 11 is adjustable to change the electric energy production of the respective generator. The two permanent magnet discs rotate with the shell 12, but the winding disc 9 does not rotate with the permanent magnet discs because it has an eccentric weight, so the coils on the disc 9 will induce current by cutting the magnetic lines.

INDUSTRIAL APPLICABILITY

The present power generation and charging device for continuous running of an electric automobile can also be used in various automobiles and equipment with a structure of rotating wheels, so as to save energies. Therefore the present invention possesses industrial applicability.

What is claimed is:

1. A power generation and charging device for continuous running of an electric automobile, comprising:
    one or more generators;
    a circuit converter;
    a charger; and
    a storage battery, wherein:
        the one or more generators are disk-type generators and are mounted on rims of wheels of the electric automobile;
        the storage battery is same as an automobile-mounted power supply;
        a plurality of current leading-out wires of the one or more generators are connected with the storage battery through the charger and the circuit converter;
        an original storage battery of the electric automobile is connected with power supply terminals of the electric automobile through the circuit converter;
        each of the one or more generators has a disk-shaped shell and a central shaft, the central shaft in the shell provided with two permanent magnet discs which are fastened on the central shaft;
        circumferences of two opposite, inner side surfaces of the two permanent magnet discs have a same size and are provided with a first permanent magnet and a second permanent magnet thereon, which are fixed within the permanent magnet discs and opposite to each other with opposite polarities;
        a winding disc that is rotatable on the central shaft is disposed between the two permanent magnet discs, two side surfaces of the winding disc provided with winding coils thereon, which are fixed within the winding disc; and
        a non-magnetic heavy object with an adjustable weight is disposed in a certain local position on a surface of the winding disc in a vicinity of an edge of the winding disc.

2. The power generation and charging device for continuous running of an electric automobile of claim 1, wherein:
    the power generation and charging device is configured for installation on various automobiles and equipment with a structure of rotating wheels.

* * * * *